May 18, 1965  W. RITZERFELD ETAL  3,183,805
ELECTRO-PHOTOGRAPHIC APPARATUS
Filed Oct. 13, 1960  8 Sheets-Sheet 1

Inventors:
Wilhelm Ritzerfeld
Gerhard Ritzerfeld
By Michael S. Striker
Attorney

May 18, 1965
W. RITZERFELD ETAL
3,183,805
ELECTRO-PHOTOGRAPHIC APPARATUS
Filed Oct. 13, 1960
8 Sheets-Sheet 2
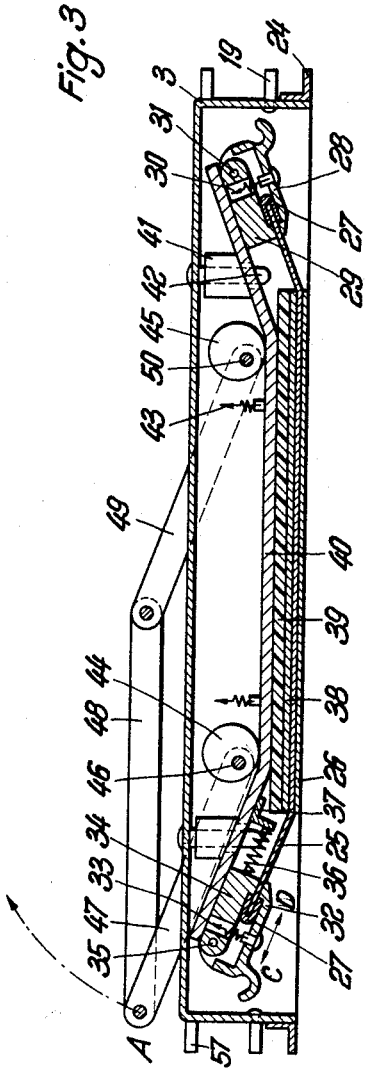
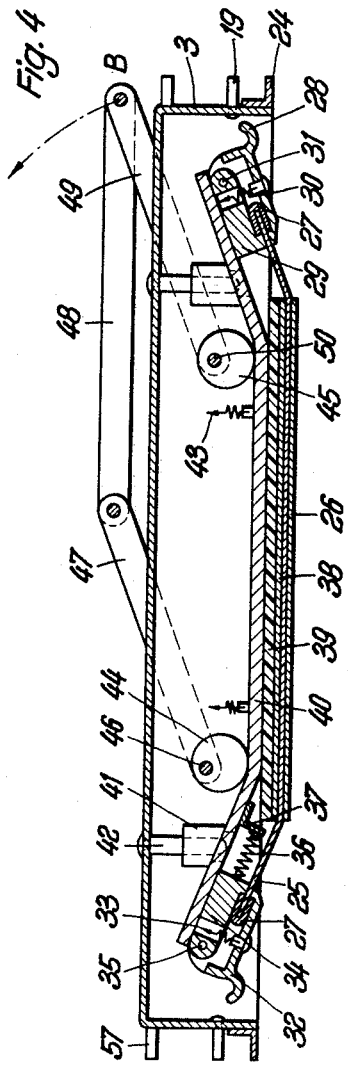
Inventors:
Wilhelm Ritzerfeld
Gerhard Ritzerfeld
By Michael S. Striker
Attorney

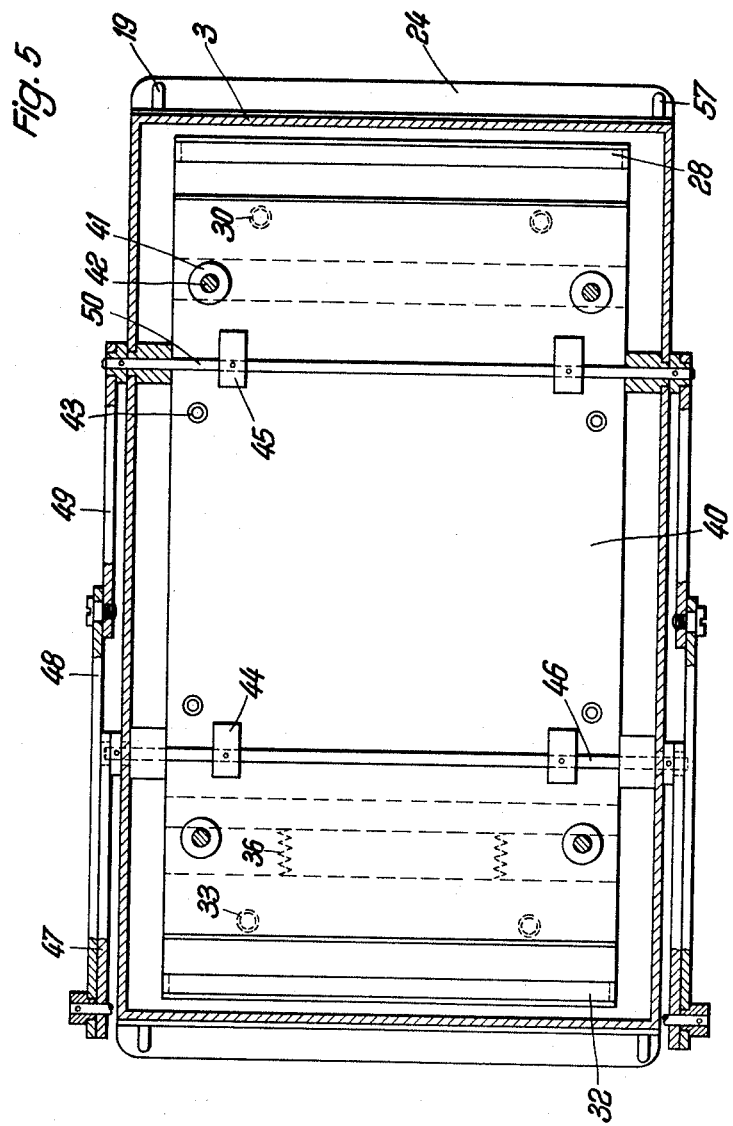

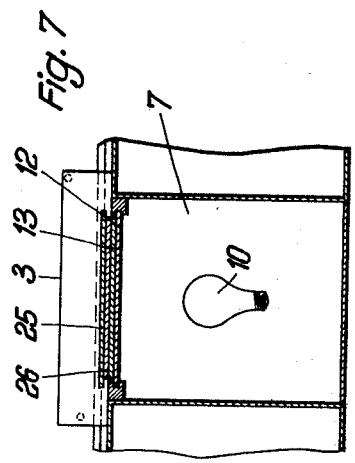
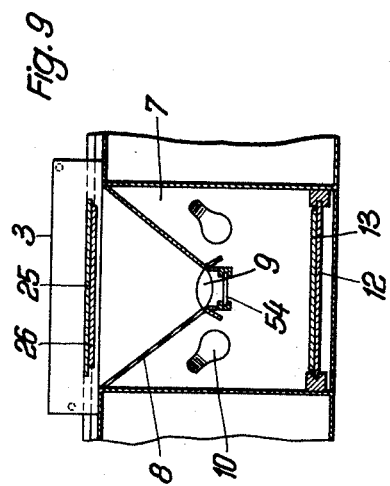
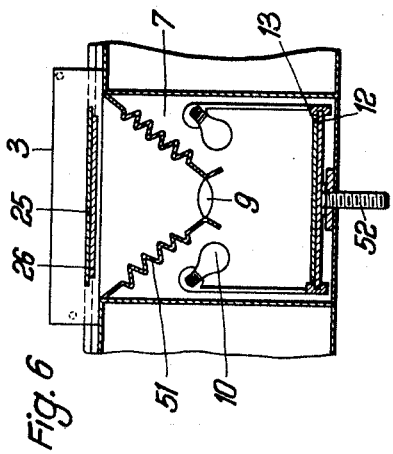
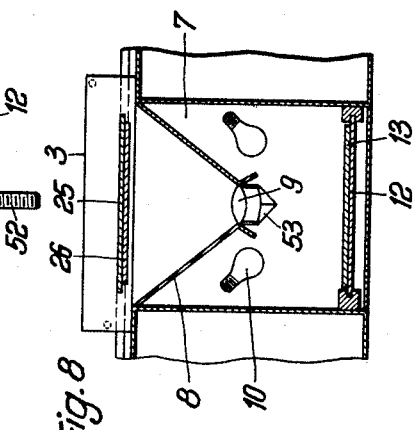

May 18, 1965 W. RITZERFELD ETAL 3,183,805
ELECTRO-PHOTOGRAPHIC APPARATUS
Filed Oct. 13, 1960 8 Sheets-Sheet 5

Inventors:
Wilhelm Ritzerfeld
Gerhard Ritzerfeld
By Michael S. Striker
Attorney

May 18, 1965  W. RITZERFELD ETAL  3,183,805
ELECTRO-PHOTOGRAPHIC APPARATUS
Filed Oct. 13, 1960  8 Sheets-Sheet 6
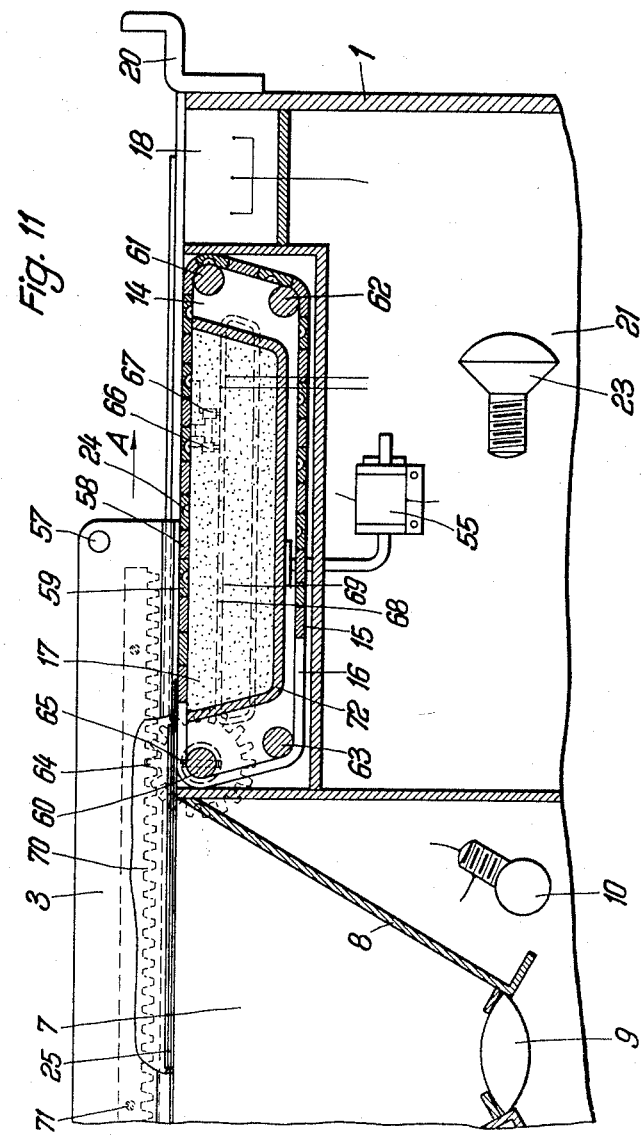
Inventors:
Wilhelm Ritzerfeld
Gerhard Ritzerfeld
By Michael S. Striker
Attorney

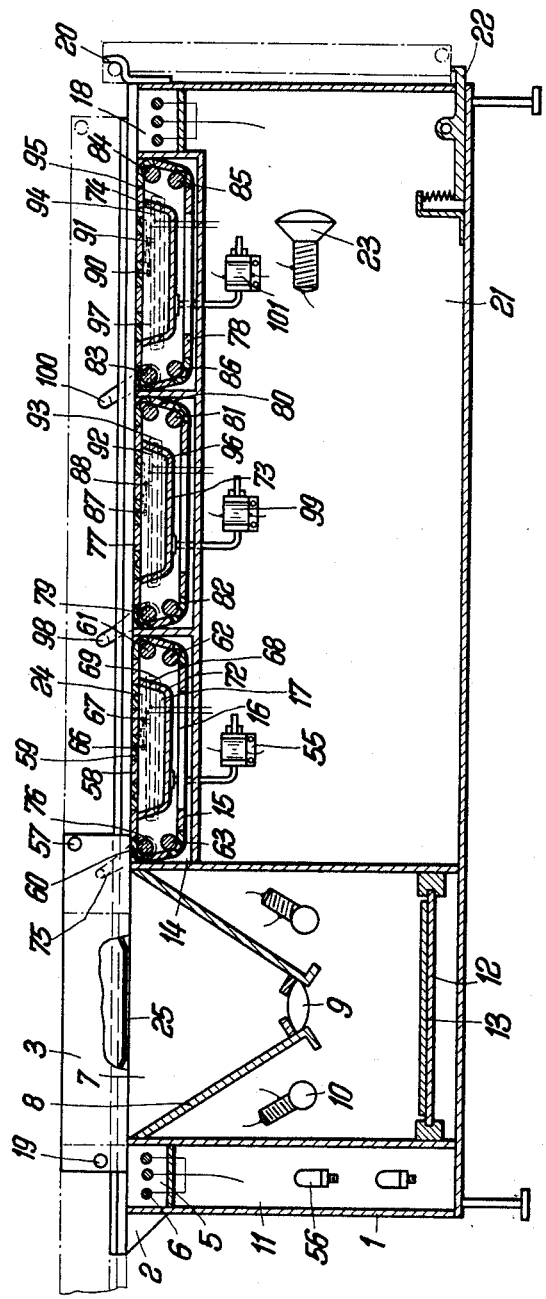

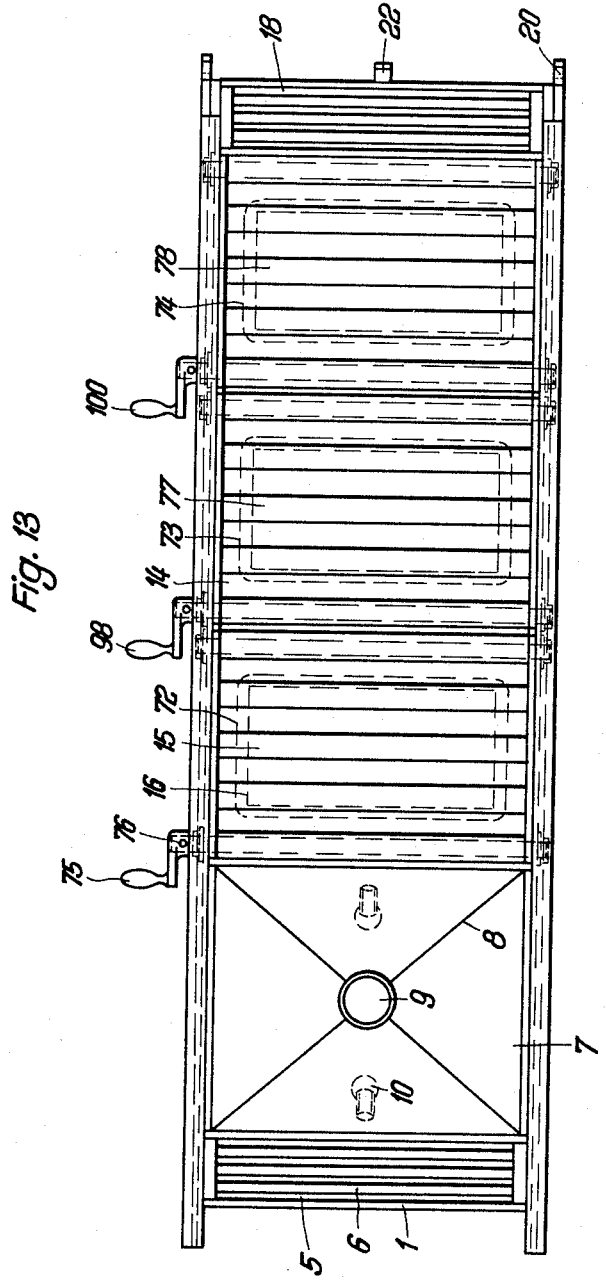

United States Patent Office 3,183,805
Patented May 18, 1965

3,183,805
ELECTRO-PHOTOGRAPHIC APPARATUS
Wilhelm Ritzerfeld, Schorlemer Allee 14, Berlin-Dahlem, Germany, and Gerhard Ritzerfeld, Franzensbader Strasse 21, Berlin-Grunewald, Germany
Filed Oct. 13, 1960, Ser. No. 62,448
Claims priority, application Germany, Oct. 15, 1959, R 26,544; Nov. 17, 1959, R 26,746; Nov. 19, 1959, R 26,757
7 Claims. (Cl. 95—1.7)

The present invention relates to electro-photographic apparatus, and more particularly to an apparatus for making electro-photographic prints in a Xerographic process. The apparatus of the present invention is suitable for making a electro-photographic and/or lithographic printing forms which have an electrostatically charged semiconductor layer. Images are formed on this layer when the same is first charged, and then exposed to light. The prints may be produced on paper as direct electro-photographic copies, or may be produced on printing forms which are either provided with a greasy ink for printing, or which have an absorbent surface so that they may be used for a lithographic printing process in which moisture and greasy ink are applied.

The present invention relates not only a lithographic printing forms which have a direct image permitting offset printing, but also to printing forms which have a mirror image and are directly printed in a lithographic process without a rubber blanket cylinder.

Apparatus for this purpose is known which comprises several independent devices. A separate device is used for providing the electrostatic charge, another device is used for exposing the electrostatically charged selenium plate, and a third separate device is used for developing the electrostatic image. Another separate device is provided for heating the plate until the image becomes permanent.

This apparatus according to the prior art has several disadvantages. First, it requires a great deal of space, secondly, they are difficult to operate, and thirdly, they are not fool-proof since the selenium plate has to be carried in a case from one device to the other, and requires opening and closing of the case before the required operation can be carried out in the respective device.

Furthermore, the apparatus of the prior art does not permit to produce a direct image on an image carrier, particularly on an image carrier in the form of a thin aluminum foil. In accordance with the prior art, the image is produced on the selenium plate, which is highly sensitive, and can be easily scratched, whereupon the printing form has to be carefully placed on the selenium plate, so as to produce on the printing form a reversed image by electrostatic reversal. This procedure has frequently caused damage to electrostatic image, or caused inaccuracies since the image was not properly placed on the printing form. Particularly, the apparatus of the prior art permits errors by the operator, since the proper sequence of operating the several devices can be easily confused. This is particularly true in apparatus in which the case with the image carrier has to be successively placed in similar pockets of different devices.

It is one object of the present invention to overcome these disadvantages of the prior art, and to provide an electro-photographic apparatus which is of simple construction, requires little space, and can be operated in an entirely fool-proof manner by an unskilled operator.

Another object of the present invention is to provide an electro-photographic apparatus by which a mirror image is directly produced on a printing form.

Another object of the present invention is to provide apparatus in which a holding means for an electrophotographic carrier is successively moved to a plurality of stations along a continuous path which is preferably located in a horizontal plane.

Another object of the present invention is to shift the image carrier to an advanced position whenever the carrier is located at a station at which an operational step is carried out, for example, at a charging station, an exposing station, or a developing station.

Another object of the present invention is to provide additional charging means for charging a developing powder provided on an exposing station.

While it is contemplated to use a developing powder which already has a positive or negative charge, or which consists of a mixture of a positive and negatively charged particles, it has been found that particularly for making Xerographic offset print images containing dyes, charged powders are unsuitable, since the powder has to be selected in accordance with other properties, for example, the coloring capacity. If this type of powder would be charged long before use, the charge would be weakened or completely dissipated at the time of use since the charge will be dissipated after about six hours.

It is the main object of the present invention to provide adjacent each other a charging station, an exposing station and a developing station, and preferably also a heating station so that the electro-photographic image carrier can be successively moved to these stations to receive an electrostatic image.

With these objects in view, the present invention relates to an apparatus for making electro-photographic prints. One embodiment of the present invention comprises a holding means for an electro-photographic image carrier, supporting means supporting the holding means for movement between a plurality of positions along a path which is preferably located in a horizontal plane, a charging station, an exposing station, and a developing station located on the supporting means along the path of movement of the carrier. In this manner, an electrostatic charge is produced on the image carrier at the charging station, an image of the original is projected onto the charged carrier at the exposing station to dissipate part of the charge, and a powder is applied to the image at the developing station, and adheres only to the non-exposed surface of the carrier. Thereupon, the electrostatic image thus formed is made permanent by heating the carrier.

In the preferred embodiment of the present invention, the holding means is moved along a horizontal plane along the stations, but it is turned through 90° before placed opposite the heating station.

A container for the developing powder is located at the developing station, and is agitated to apply powder to the image carrier when the same is at the developing station. In the preferred embodiment of the present invention, a cover means is provided in the form of an endless band, which is movable between a position closing the open container and a position in which an opening in the band permits the powder to pass out of the container and to settle on the carrier.

It is advantageous, but not necessary, to provide a device for removing superfluous powder from the image carrier before the image is fused at the heating station and becomes permanent. This device is preferably provided with electric means having a charge opposite to the charge of the carrier.

The exposing station is preferably provided with optical means for producing a mirror image of an original copy on the carrier, which may be a printing form. In this manner, imprints can be made by the printing foil directly on paper.

However, the optical means of the exposing station may be modified to produce a direct image on the semi-conductive layer of the image carrier, as is required when the printing foil carrier is to be used for offset printing.

In a modified embodiment of the present invention, several developing stations are provided, each of which has a container for a different developing powder. The material of the powder, or the height or direction of the charge, may be different, so that superimposed images produced by repeated exposures at the exposing station, may be independently developed at different developing stations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a sectional view of a holding means for an image carrier;

FIG. 4 is a longitudinal sectional view illustrating another operational position of the holding means of FIG. 3;

FIG. 5 is a plan view of the holding means shown in FIG. 3;

FIG. 6 is a fragmentary sectional view illustrating a modification of the exposing station which may be used in the apparatus of FIG. 1;

FIG. 7 is a sectional view of another modified exposing station;

FIG. 8 is a sectional view illustrating another modification of the exposing station for the purpose of projecting direct images of an original copy for the purpose of producing an offset printing form;

FIG. 9 is another modification of the exposing station including filter means;

FIG. 11 is a fragmentary longitudinal view on an enlarged scale particularly illustrating the modified features of the developing station;

FIG. 12 is a longitudinal schematic view illustrating an apparatus according to another embodiment of the present invention; and FIG. 13 is a plan view of the apparatus shown in FIG. 12.

Figure 1:
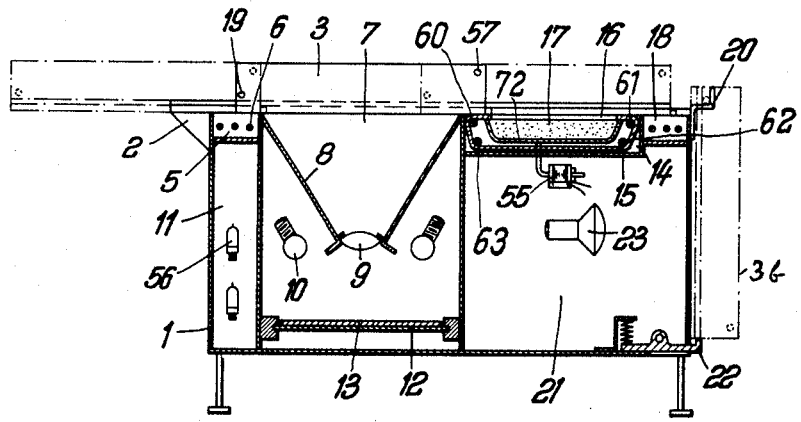
FIG. 1 is a longitudinal schematic section illustrating an apparatus according to the present invention.
Figure 2:
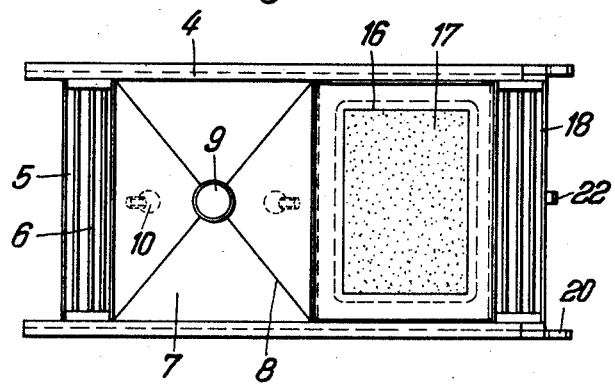
FIG. 2 is a plan view of the apparatus shown in FIG. 1.

Referring now to the drawings, and more particularly to FIGS. 1 and 2, the supporting means 1 of the apparatus includes a plurality of upright walls defining several chambers. Wires 6 are charged to a suitable voltage by electronic means 11 including electronic tubes 56. The chamber 5 is open on top, and the arrangement constitutes a charging station. Another chamber 7 is located adjacent the charging station, and is also open on top. A conical support 8 is mounted in chamber 7 and carries at its apex a lens means 9. Illuminating lamps 10 are arranged in chamber 5 to throw light on an original 13 which lies flat on a plate 12. A mirror image of the original 13 is thus projected through lens 9 toward the open end on top of chamber 7.

A chamber 21 is located adjacent chamber 7, and at the open top of chamber 21, an open container 72 is provided in which a developing powder 17 is located. An agitating means 55 vibrates container 71 so that the powder may be agitated to rise above the open top of the container. A cover band 15 passes about container 72 and has an opening 16. The endless cover band 15 passes over a plurality of rollers 60 to 63, and when cover band 15 is moved, the opening 16 is displaced so that the container 72 is closed by a solid portion of the cover band. In the normal position of the apparatus, container 72 is closed by the cover band, so that the powder 17 cannot escape from the container.

Another chamber 18 is provided in chamber 21, and contains electrically charged wires. In the lower portion of chamber 21, a heating means, shown to be an infra-red lamp 23 is provided which is directed toward a side wall of supporting means 1.

The upper edges of the upright walls of supporting means 1 are located at the same level, which is also the level of the upper horizontal portion of the cover band 15. Therefore, it can be said that the charging station 5, 6, 11, 56, the exposing station 7, 9, 10, 12, the developing station 15, 16 and the powder-removing station 18 are all located in a horizontal plane. Supporting means 1 include guide means 4 formed with grooves in which corresponding guide projections of holding means for an electrophotographic image carrier are located.

The holding means for the carrier are shown in detail in FIGS. 3, 4 and 5. A case 3 has guide projections 24 by which the case is slidably guided in guide means 4 of support 1. A first pair of projecting pins 19, and a second pair of projecting pins 57 are also fixed to the side walls of case 3.

The printing foil 25 has according to the present invention a semi-conductive electro-photographic layer 26, and has U-shaped reinforcing parts adhesively attached to the ends thereof, so that shoulders are formed on the ends of the printing foil 25. An abutment plate 40 has adhesively attached thereto a rubber plate 39 and a charging plate 38 which is electrically connected to the charging means 11 so as to be capable of charging the printing foil 25 with which it is in contact. Clamping means are provided and secured to the ends of the abutment plate 40, and include a first clamping part 29, and a spring loaded clamping part 28 pivotally mounted on a pin 31 on clamping part 29. Clamping parts 28 and 29 have inner shoulders engaging the shoulders formed on the printing form by the U-shaped reinforcement 27. The other clamping means include a first clamping part 34 mounted on abutment plate 40 for movement in direction of the arrow C–D, and a second clamping part 32 pivotally mounted on a pin 35 and spring loaded by a spring 33. Clamping parts 32 and 34 have inner shoulders against which the shoulders formed by the reinforcing member 27 abut. A spring 36 abuts a fixed bracket 37 and clamping part 34 and urges clamping part 34 to move with clamping part 32 in direction of the arrow C so that the foil 25 is tensioned and pressed against the charging plate 38. Abutment plate 40 is mounted on case 3 by means of guide members 41 and guide pins 42 which pass through corresponding openings in abutment plate 40 so that the same is movable from the position as shown in FIG. 3 to the more advanced position as shown in FIG. 4 in which the printing foil 25, 26 is located outside of the casing.

Springs 43 connect abutment plate 40 with casing 3 and urge abutment plate 40 and the clamping means with the printing foil to the retracted position shown in FIG. 3 in which the abutment plate 40 abuts on the oblique surfaces of guide members 41.

A pair of shafts 46 and 50 are turnably mounted in the walls of case 3, as is best seen in FIG. 5. Pairs of eccentric rolls 44 and 45 are respectively secured to shafts 46 and 50, and turn with the same. Shafts 46 and 50 are secured to pairs of arms 47 and 49 which are connected by links 48 and extend parallel to each other. When link 48 is moved from the position A in FIG. 3 to the position B in FIGURE 4, with arms 47 turning in direction of the arrow in clockwise direction, the eccentric rolls turn with shafts 46 and 50 and urge the abutment plate 40 from the retracted position shown in FIG. 3 to the advanced position shown in FIG. 4 in which the printing foil 25, 26 is located outside of the case.

As best seen in FIG. 1, the case with the printing foil is placed on brackets 2 and in guide means 4 of the support 1 at the beginning of the operation. The pins 57 on case 3 are placed on brackets 2 of support 1. Case 3 is swiveled so that the plate means 40, 39 and 38 are accessible from the top. The printing foil 25, 26 is inserted into the clamping means so that the holding means for the printing foil are in the position shown in FIG. 3. Thereupon, the case is again swiveled until the printing foil 25 faces downward in the position 8a of FIG. 3, and the case 3 is moved over the charging station 5, 6 so that the semi-conductive layer 26 is electrostatically charged. During further movement of case 3 along the guide means, the case 3 assumes the position shown in solid lines in FIG. 1 so that the printing foil is located at the exposing station, while closing the open end of chamber 7 so that no light can enter. When case 3 is in the correct position, it engages a switch, not shown, on support 1, so that an exposure is made on the electro-photographic layer 26 and the charge is dissipated where light corresponding to the image of the original 13 reaches the layer 26.

Case 3 is now further moved along the path defined by guide means 4 until it is located over the open container 72. During such movement, the case 3 engages a projecting part of the cover band 15, and moves the cover band from a position in which it closes the container 72 to the illustrated position in which the opening 16 of cover band 15 is located on the open top of container 72, permitting the powder 17 agitated by the vibrator 55 to rise and to be deposited on the layer 26. The eccentric means 44, 45 are now shifted from the position of FIG. 3 to the position of FIG. 4 so that the foil 25, 26 is moved to an advanced position located in contact with the powder 17. The powder 17 adheres to the negative charged unexposed portions of layer 26 and does not adhere to the exposed portions where the charge was dissipated by the light.

When case 3 is further moved along guide means 4, layer 26 passes over the powder-removing station 18 where charged conductors attract loose powder from the layer 26. During such movement, the cover band 15 is further turned so that container 72 is again closed by another portion of the cover band 15.

During further movement of the case, pins 19 on case 3 reach a bearing bracket 20 so that the case 3 is pivoted to the position 3b shown in dash-and-dot lines in FIG. 1 in which the foil 25, 26 faces the heating means 23 so that the image on layer 26 is baked and fused and becomes permanent. The infra-red lamp 23 is preferably controlled by a switch operated by case 3 when the same turns to the position 3b. In this position a spring-loaded catch 22 arrests case 3 by engaging a corresponding projection on the case. The impact of case 3 falling against the wall of support 1 when assuming the position 3b, also helps to remove excess powder from the layer 26, and this may be entirely satisfactory so that the powder-removing means 18 may be omitted under certain circumstances.

During the movement of the holding means for the image carrier 25, 26 past the charging station, exposing station, developing station, and heating station, a permanent image is thus formed on the image carrier, which is a mirror image of the original 13. Since the image carrier is a foil suitable for producing direct imprints, positive direct images can now be printed on paper by means of the thus prepared printing form in a lithographic direct printing machine.

FIG. 6 shows a modified arrangement of the exposing station. Instead of the rigid conical support 8, an accordion-pleated support 51 is provided, permitting adjustment of the position of lens 9 so that the image of the original 13 can be enlarged or reduced in size when projected onto the image carrier 25, 26. A threaded spindle 51 is connected to the support plate 12 of the original 13, and permits adjustment of the position of the original 13 relative to lens 9.

FIG. 7 illustrates a modification for producing contact prints on the image carrier 25, 26. The supporting plate 12 of the original 13 is located directly adjacent the open end of the chamber 7, and can be placed in direct contact with the layer 26 when the holding means are in the advanced position illustrated in FIG. 4. The light of lamp 10 passes through the original to dissipate the charge of layer 26. Another modified embodiment of the exposing station is shown in FIG. 8. A prismatic reversing mirror 53 is placed adjacent lens 9, so that the image projected on layer 26 is a posive direct image. In this manner, a printing foil suitable for offset printing in a printing machine having an intermediate transfer roller covered by a rubber blacket.

The modified embodiment of FIG. 9 corresponds to the embodiment of FIG. 1, but a filter 54 is placed before the lens 9. Filter 54 can be replaced by other filters, whereby a colored original can be used to produce a plurality of color images on different image carriers 25, 26 which are later on used to produce superimposed colored imprints on a copy sheet.

Referring now to the embodiment illustrated in FIGS. 10 and 11, it will be seen that this embodiment corresponds substantially to the embodiment described with reference to FIGS. 1 to 5. However, in the embodiment of FIG. 10, the endless band 15 is made of interconnected links 58 and 59. The links 59 contain charging wires 24 which are insulated from each other. The ends of charging wires 24 are connected to each other, and are also electrically connected to slide contacts 66 and 67 which slide on a pair of loop-shaped contact rails 68 and 69 as the endless cover band 15 moves about rollers 60 to 63. Roller 60 is connected to a gear 64 for turning movement, and a rack bar 70 is secured by screws 71 to case 3 and moves with the same while meshing with gear 64. Consequently, during movement of case 3 from the position located at the exposing station, to the position located at the developing station, gear 64 will be turned by rack bar 70 so that the opening 16 of cover band 15 is moved to a position located above the open top of container 72, permitting the powder 17 to reach layer 26 of image carrier 25 when the same is in the advanced position shown in FIG. 4.

The charging wires 24 charge powder 17 in the required sense, so that developing powders of different types can be used. In this manner, the developing powder 17 need not be previously charged, but is fully charged at the moment in which such charge is required. This is particularly advantageous if the developing powder has to be selected in accordance with its coloring capacity and similar properties.

Figure 10:
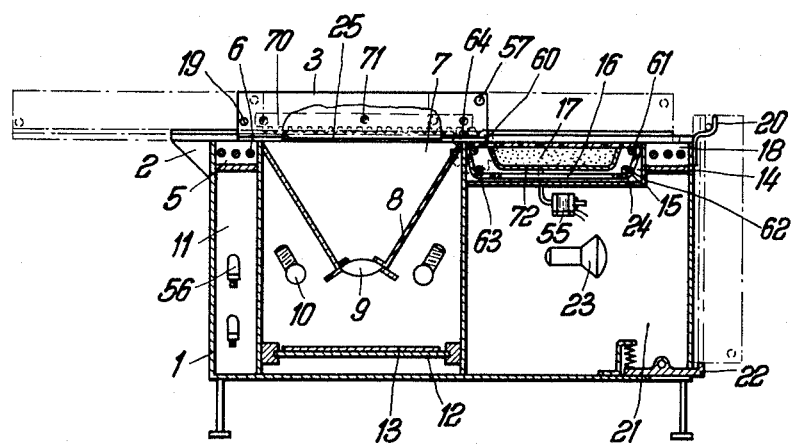
FIG. 10 is a longitudinal schematic view of an apparatus according to the present invention with an improved developing station.

The embodiment illustrated in FIGS. 12 and 13 operates on the same electro-photographic principle as the embodiments of FIGS. 1 and 10. However, the charging station 5, 6 can be connected to different voltages, for example, 2000 volts, 4000 volts and 6000 volts. The switch means for selectively connecting the charging wires 6 to the different voltages are of a conventional nature, and not shown in FIG. 12.

Three developing stations are provided, the first adjacent the exposing station corresponding in all respects to the developing station described with reference to FIG. 11. However, the roller 60 is connected to a crank handle 75, as best seen in FIG. 13, so that the endless band with the charging wires 24 is manually operated for placing the opening 16 over the open container 72.

The second developing station includes an endless band 77 passing over roll 79, 80, 81 and 82, roller 79 being operated by a crank 97. The third developing station has an endless cover band 78 passing over rolls 83, 84, 85 and 86, roll 83 being connected to a manually operated crank handle 100. The links 59 of the endless band 50, 77, 78 support charging wires 24 whose plus and minus ends are interconnected and electrically connected to slide contacts 66 and 67, 87 and 88, and 90 and 91, which respectively slide on loop-shaped contact rails 68 and 69, 92 and 93, 94 and 95, respectively.

The closed cover bands 50, 77, 78 prevent the differently colored powders 17, 96 and 97 from leaving their respective containers, except when manually turned to a position in which the respective openings in the cover bands are located on top of the containers. The cover bands prevent also light from falling onto the exposed image carrier 25, 26 while the same is located at the developing stations.

The apparatus is operated in the following manner. The image carrier is placed in the clamping means in the case 3, and moved first over the charging station to be charged at a voltage of 2000 volts, then shifted to the exposing station, where an image of the original 13 is formed on the layer 26, and then shifted to the developing station to be dusted with powder 17. When the case 3 has been placed over the first developing station, the crank handle 75 is operated to place the opening 16 over container 72. When the image carrier has been sufficiently powdered, the crank handle 75 is again operated so that the cover band 15 closes container 72, whereupon case 3 is shifted back to the charging station where layer 26 is charged with a voltage of 4000 volts. The case 3 is then shifted to the exposing station, where another exposure is made. Thereupon, the case 3 is shifted to the second developing station to be dusted with powder 96 after the opening 16 has been placed over the container by operation of handle 98.

The case 30 is then again returned to the charging station where it is charged with 6000 volts. Another exposure is made at the exposing station, whereupon the case 3 is moved to the third developing station to be dusted with the powder 97 passing through the opening 16 in the endless cover band 78. When this operation is completed, crank handle 100 is again operated to close container 74, whereupon the case 3 with the image carrier 25, 26 is moved first to the dust removing station 18, and then pivoted through 90° to a position in which the heating means 23 fuses the powder to form a pertinent image on the printing foil 25, 26.

While the image carrier 25, 26 is located over one of the containers at one of the developing stations, the respective container is vibrated by one of the agitators 55, 99, 101 so that the powder is agitated, and is well deposited on the image carrier 25, 26 while the same is in the position shown in FIG. 4.

Before each exposure in the exposing station, the original 13 is changed for another original. In this manner, several images can be provided on the same image carrier, provided that the developing powders are either of a different material, or different regarding the direction of the charge, or the voltage of the charge.

It will be understood that each of the elements described above, or two or more together, may also find a useful application in other types of printing apparatus differing from the type described above.

While the invention has been illustrated and described as embodied in an electro-photographic apparatus of the Xerographic type, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An apparatus for making electro-photographic prints, comprising, in combination, supporting means having guide means extending along in predetermined path; a charging station located on said supporting means along said path; an exposing station including a means for holding an original and a means for projecting an image for the original, said exposing station being located on said supporting means adjacent said charging station along said path; a developing station located on said supporting means adjacent said exposing station along said path, said developing station including an open container for a developing powder, and a cover means movable between a closing position closing said open container, and an open position; and a holding means including a case open one one side and a holder for an electro-photographic image carrier mounted in said case so that said image carrier faces toward said open side, said case being guided in said guide means for movement along said path between a plurality of positions in which said image carrier successively confronts said charging station, said exposing station, and said developing station, said case having a means for engaging said cover means and for moving the same from said closing position to said open position when moving from said exposing station to said developing station whereby an electrostatic image can be formed on said carrier by successive operation of said stations in said positions of said case.

2. An apparatus for making electro-photographic prints, comprising, in combination, supporting means having guide means extending along in predetermined path; a charging station located on said supporting means along said path; an exposing station including a means for holding an original and a means for projecting an image for the original, said exposing station being located on said supporting means adjacent said charging station along said path; a developing station located on said supporting means adjacent said exposing station along said path, said developing station including an open container for a developing powder, and an endless cover band having an opening and surrounding said open container, said cover band being movable between a closing position closing said open container and an open position in which said opening uncovers said open container; and a holding means including a case open on one side and a holder for a electro-photographic image carrier mounted in said case so that said image carrier faces toward said open side, said case being guided in said guide means for movement along said path between a plurality of positions in which said image carrier successively confronts said charging station, said exposing station, and said developing station, said case having a means for engaging said cover band and for moving the same from said closing position to said open position when moving from said exposing station to said developing station whereby an electrostatic image can be formed on said carrier by successive operation of said stations in said positions of said case.

3. An apparatus for making electro-photographic prints, comprising, in combination, supporting means having guide means extending along in predetermined path; a charging station located on said supporting means along said path; an exposing station including a means for holding an original and a means for projecting an image for the original, said exposing station being located on said supporting means adjacent said charging station along said path; a developing station located on said supporting means adjacent said exposing station along said path, said developing station including an open container for a developing powder, and an endless cover band including electric charging means for the developing powder and having an opening and surrounding said open container, said cover band being movable between a closing position closing said open container and an open position in which said opening uncovers said open container; and a holding means including a case open on one side and a holder for an electro-photographic image carrier mounted in said case so that said image carrier faces toward said open side, said case being guided in said guide means for movement along said path between a plurality of positions in which said image carrier successively confronts said charging station, said exposing station, and said developing station, said case having a means for engaging said cover band and for moving the same from said closing position to said open position when moving from said exposing station to said developing station whereby an electrostatic image can be formed on said carrier by successive operation of said stations in said positions of said case.

4. An apparatus for making electro-photographic prints, comprising, in combination, supporting means including a cabinet open on top and at one end, and having guide means extending along a predetermined straight path along the open top of said cabinet; a charging station located on said supporting means along said path; an exposing station including a means for holding an original and a means for projecting the image of the original, said exposing station being located on said supporting means adjacent said charging station along said path; a developing station located on said supporting means adjacent said exposing station along said path, said station being located in said cabinet; a heating station located at the end of said path in said cabinet facing said open end; and a holding means including a case open at the bottom and a holder for an electro-photographic image carrier mounted in said case so that said image carrier faces toward said open bottom, said holder being mounted in said case movable between a retracted position for movement along said path, and an operative position for treatment at said stations, said holder including a plate, and spring-loaded clamping means at opposite end of said plate for holding the ends of a printing form foil constituting said electro-photographic image carrier, said holding means including another plate between said first mentioned plate and said printing form foil, said other plate being electrically connected to said charging means, said case being guided on said guideways of said guide means for sliding movement along said path between a plurality of positions in which said image carrier successively confronts said charging station, said exposing station and said developing station, and in which position said cabinet and said case form a dust-proof and light-proof enclosure, and being turnably supported on said pivot means for pivotal movement to a position closing said open end of said cabinet, in which said position of said carrier confronts said heating station whereby a permanent electrostatic image can be formed on said carrier by successive operations of said stations in said positions of said case and with said holder in said operative position.

5. An apparatus for making electro-photographic prints, comprising, in combination, supporting means including a cabinet open on top and at one end, and having guide means extending along in predetermined path along said open top; a charging station located on said supporting means along said path; an exposing station including a means for holding an original and a means for projecting an image for the original, said exposing station being located on said supporting means adjacent said charging station along said path; a developing station located on said supporting means adjacent said exposing station along said path, said developing station including an open container for a developing powder, and a cover means movable between a closing position closing said open container and an open position, said stations being located in said cabinet; a heating station located at the end of said path in said cabinet facing said open end; and a holding means including a case open on one side and a holder for an electro-photographic image carrier mounted in said case so that said image carrier faces toward said open side, said case being guided in said guide means for sliding movement along said path between a plurality of positions in which said image carrier successively confronts said charging station, said exposing station and said developing station, and for pivotal movement to a position in which said carrier confronts said heating station whereby a permanent image can be formed on said carrier by successive operation of said stations in said positions of said case, said case having a means for engaging said cover means and for moving the same from said closing position to said open position when moving from said exposing station to said developing station.

6. An apparatus for making electro-photographic prints, comprising, in combination, supporting means including a cabinet open on top and at one end, and having guide means extending along a predetermined path along said open top; a charging station located on said supporting means along said path; an exposing station including a means for holding an original and a means for projecting an image of the original, said exposing station being located on said supporting means adjacent said charging station along said path; a developing station located on said supporting means adjacent said exposing station along said path, said developing station including an open container for a developing powder, and an endless cover band having an opening and surrounding said open container, said cover band being movable between a closing position closing said open container and an open position in which said opening uncovers said open container, said stations being located in said cabinet; a heating station located at the end of said path in said cabinet facing said open end; and a holding means including a case open on one side and a holder for an electro-photographic image carrier mounted in said case movable between a retracted position and an advanced position in which said carrier is located outside of said open side of said case, said holding means including manually operable eccentric means turnably mounted on said case and engaging said holder for shifting the same to said advanced position, and spring means for retracting said holder, said case being guided in said guide means for sliding movement in said retracted position of said holder along said path between a plurality of positions in which said image carrier successively confronts said charging station, said exposing station and said developing station, and for pivotal movement to a position in which said carrier confront said heating station whereby a permanent image can be formed on said carrier by successive operation of said stations in said positions of said case.

7. An apparatus for making electro-photographic prints, comprising, in combination, supporting means including a cabinet open on top and at one end, and having guide means including a pair of straight horizontal guideways extending along a predetermined straight path along the open top of said cabinet, and pivot means at the ends of said guideways; a charging station located on said supporting means along said path; an exposing station including a means for holding an original and a means for projecting the image of the original, said exposing station being located on said supporting means adjacent said charging station along said path; a developing station located on said supporting means adjacent said exposing station along said path, said station being located in said cabinet; a heating station located at the end of said path in said cabinet facing said open end; and a holding means including a case open at the bottom and a holder for an electro-photographic image carrier mounted in said case so that said image carrier faces toward said open bottom, said holder being mounted in said case movable between a retracted position for movement along said path, and an operative position for treatment at said stations, said case being guided on said guideways of said guide means for sliding movement along said path between a plurality of positions in which said image carrier successively confronts said charging station, said exposing station and said developing station, and in which position said cabinet and said case form a dust-proof and light-proof enclosure, and being turnably supported on said pivot means for pivotal movement to a position closing said open end of said cabinet, in which said position said carrier confronts said heating station whereby a permanent image can be formed on said carrier by successive operations of said stations in said positions of said case and with said holder in said operative position.

References Cited by the Examiner

UNITED STATES PATENTS

| | | | |
|---|---|---|---|
| 2,221,776 | 11/40 | Carlson | 95—1.7 |
| 2,588,675 | 3/52 | Walkup | 95—1.7 |
| 2,690,394 | 9/54 | Carlson | 95—1.7 |
| 2,752,833 | 7/56 | Jacob | 95—1.7 |
| 2,914,996 | 12/59 | Whitham | 95—1.7 |
| 3,009,402 | 11/61 | Crumrine | 95—1.7 |

NORTON ANSHER, *Primary Examiner.*

JOHN M. HORAN, *Examiner.*